United States Patent [19]

Jardin

[11] 4,407,268
[45] Oct. 4, 1983

[54] SOLAR FURNACE
[76] Inventor: Albert C. Jardin, 170 Old Mill Blvd., Warwick, R.I. 02889
[21] Appl. No.: 341,257
[22] Filed: Jan. 21, 1982

Related U.S. Application Data
[62] Division of Ser. No. 136,896, Apr. 3, 1980, Pat. No. 4,326,501.

[51] Int. Cl.³ .............................................. F24J 3/02
[52] U.S. Cl. .................................... 126/430; 126/400; 126/435; 126/437
[58] Field of Search .............. 126/417, 400, 430, 435, 126/436, 437, 450, 424; 165/18

[56] References Cited
U.S. PATENT DOCUMENTS

| | | | |
|---|---|---|---|
| 4,059,226 | 11/1977 | Atkinson | 126/400 |
| 4,068,652 | 1/1978 | Worthington | 126/430 |
| 4,088,266 | 5/1978 | Keyes | 126/400 |
| 4,089,142 | 5/1978 | Kachadorian | 126/400 |
| 4,094,302 | 6/1978 | Rohr | 126/400 |
| 4,111,189 | 9/1978 | Dizon | 126/400 |
| 4,141,339 | 2/1979 | Weinstein | 126/449 |
| 4,154,220 | 5/1979 | Loth | 126/439 |
| 4,169,461 | 10/1979 | Haug et al. | 126/400 |
| 4,187,904 | 2/1980 | Kuhnlein | 126/400 |
| 4,205,662 | 6/1980 | Rhodes | 126/449 |
| 4,241,782 | 12/1980 | Schoenfelder | 126/400 |
| 4,257,399 | 3/1981 | Shonerd | 126/436 |
| 4,324,226 | 4/1982 | Beck | 126/450 |
| 4,338,917 | 7/1982 | Keller | 126/436 |
| 4,338,918 | 7/1982 | Milburn | 126/430 |
| 4,343,295 | 8/1982 | Dubicki | 126/437 |

Primary Examiner—Daniel J. O'Connor
Attorney, Agent, or Firm—Barlow & Barlow, Ltd.

[57] ABSTRACT

The invention comprises a single unit which serves as the solar collector, heat storage area and the heat exchanger. A generally rectangular tank is provided with suitably heavy insulated walls at the bottom, ends and rear. One side, facing the sun is open and the opening extends into a portion of the top. The top is provided with a thickly insulated cover. The open side is provided with a heat collecting surface, the preferred angle being the latitude plus 10°. The water is carried through suitable tubing which enters the tank through one end wall and then out through the same or another end wall. The tank is then filled with a suitable material having good heat storage and heat exchange properties. The best material is an eutectic salt having extremely high heat absorption and storage ability in direct contact with the container wall which is designed to absorb heat radiation, and in direct contact with the tubing to transfer the heat to the water passing through. Other substances such as concrete can also be used. The heat collecting surface is covered with an insulating glass or transparent plastic twin-walled sheet. The unit is attached to the water supply through the tubing extending at one side, the conventional water supply pressure being sufficient to operate the unit. The unit is placed on the ground adjacent the building. The unit is modular and the effects can be increased by adding units in line and hooking them up in series or parallel as desired. The system lends itself to the use of much smaller units hooked together in banks for easier handling.

3 Claims, 6 Drawing Figures

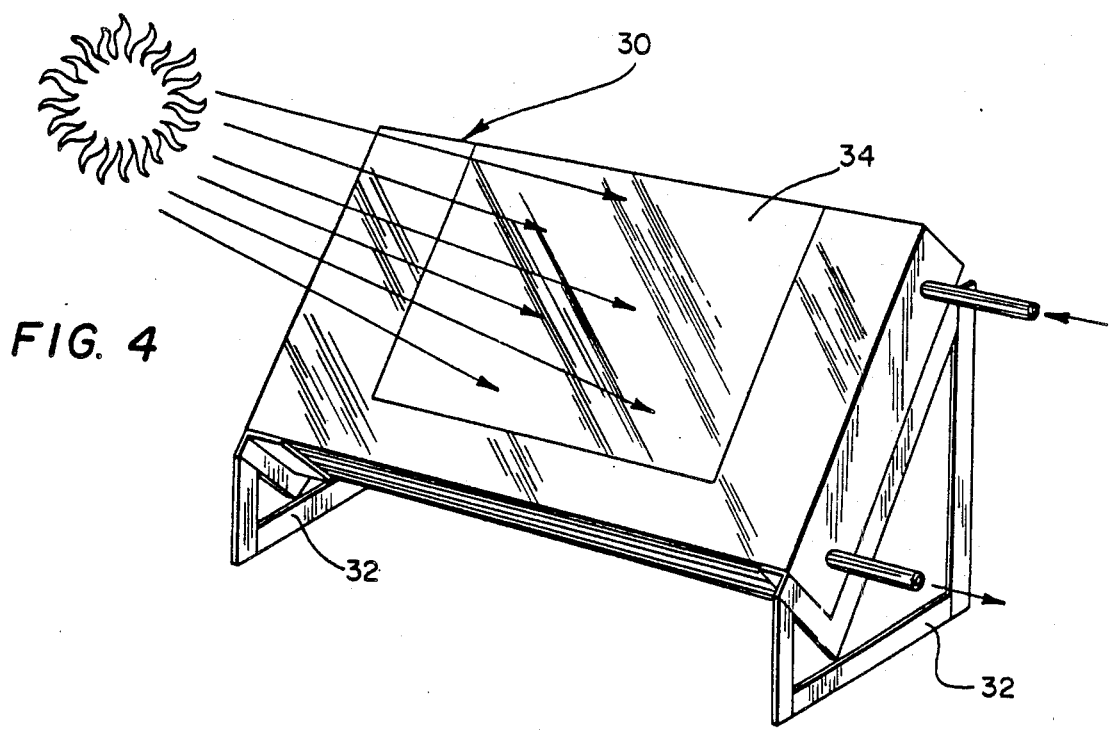
FIG. 4
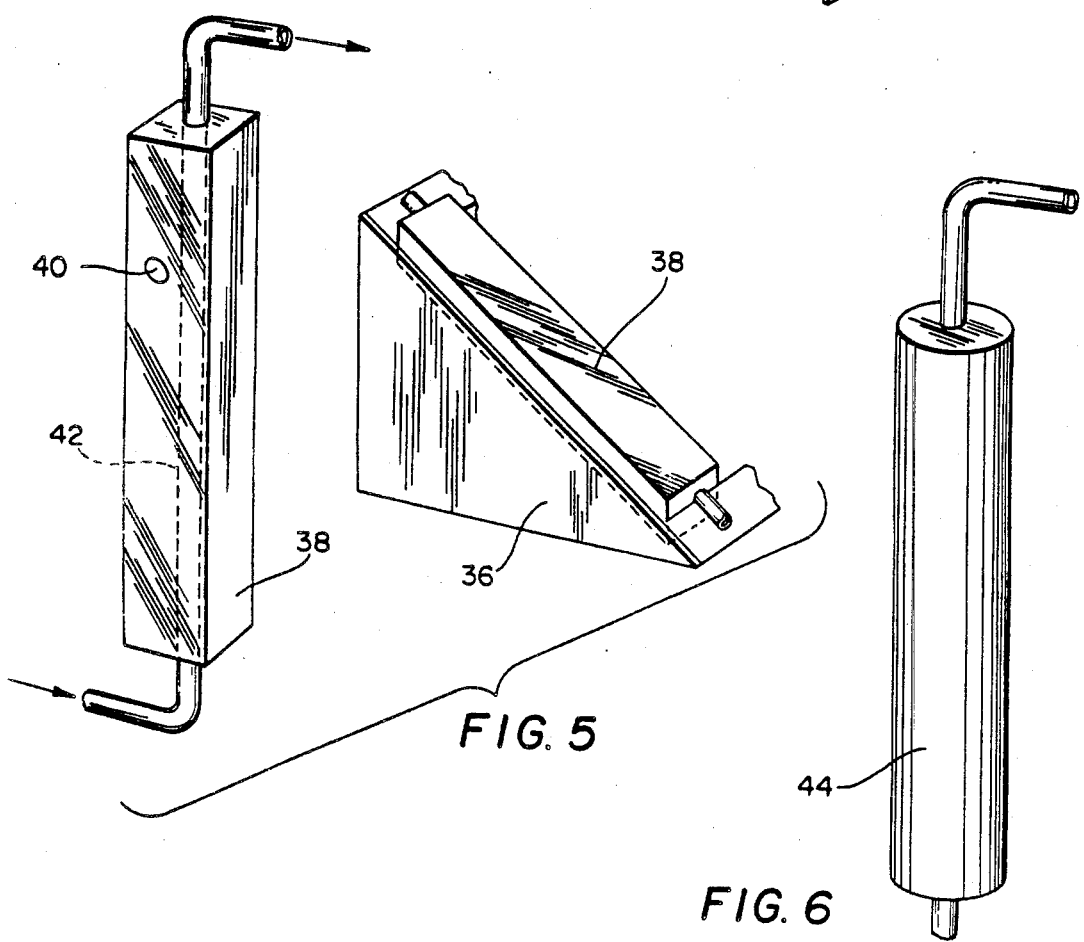
FIG. 5
FIG. 6

SOLAR FURNACE

CROSS REFERENCE TO RELATED APPLICATION

This application is a division of my application Ser. No. 136,896, filed Apr. 3, 1980, now U.S. Pat. No. 4,326,501.

BACKGROUND OF THE INVENTION

Solar units are now becoming popular for heating water and buildings. However, these are costly to manufacture and to install. Most of these units are mounted on the roof and act as solar collectors. The heat collected must then be stored and some means of heat exchange must be provided. The system must be provided with differential thermostats, controls, pressure reducing controls and other types of controls, all complex and costly.

SUMMARY OF THE INVENTION

The present invention greatly reduces the complexity and cost by providing a single unit which serves as the solar collector heat storage area, and the heat exchanger. A steel or reinforced fiberglass tank is provided with one wall which is oriented at an angle that allows maximum insolation during December and January north of the equator. This is approximately equal to the latitude of installation plus 10°. Tubing is used to carry the cold water from the building supply through the tank and back to the building hot water system of heater. The tank is filled and surrounds the tubing with eutectic salts or similar material or concrete for storing the heat from the collector side of the tank. These salts also act as heat transfer agents to heat the water passing through the tubing. The salts are added to the tank after the tank has been placed in its permanent site by heating the salts to their melting point (80°) and pouring into the tank. The unit is modular and several units can be attached in series or parallel if desired.

DESCRIPTION OF THE DRAWINGS

In the drawings:

FIG. 4 is a perspective view of a modified form of the invention;

FIG. 5 is a perspective view of a second modified form of the invention; and

FIG. 6 is a perspective view of a modified form of the invention similar to the form shown in FIG. 5.

DESCRIPTION OF THE INVENTION

Figure 1:
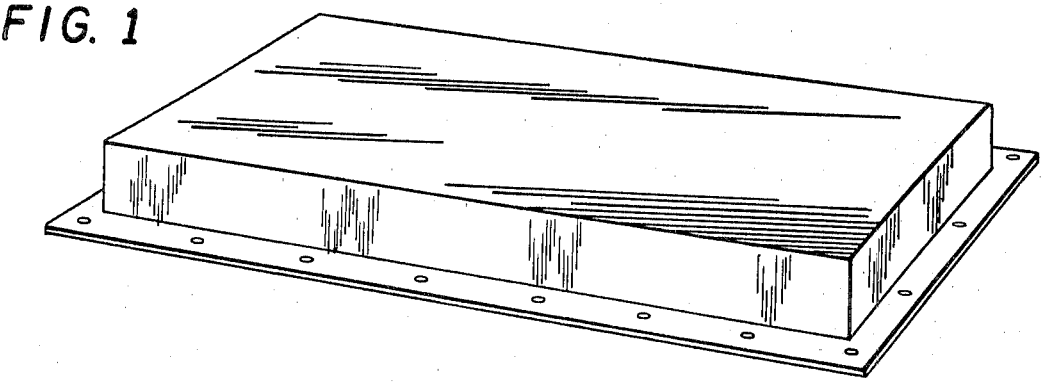
FIG. 1 is a perspective view of the cover for the unit of the present invention.
Figure 2:
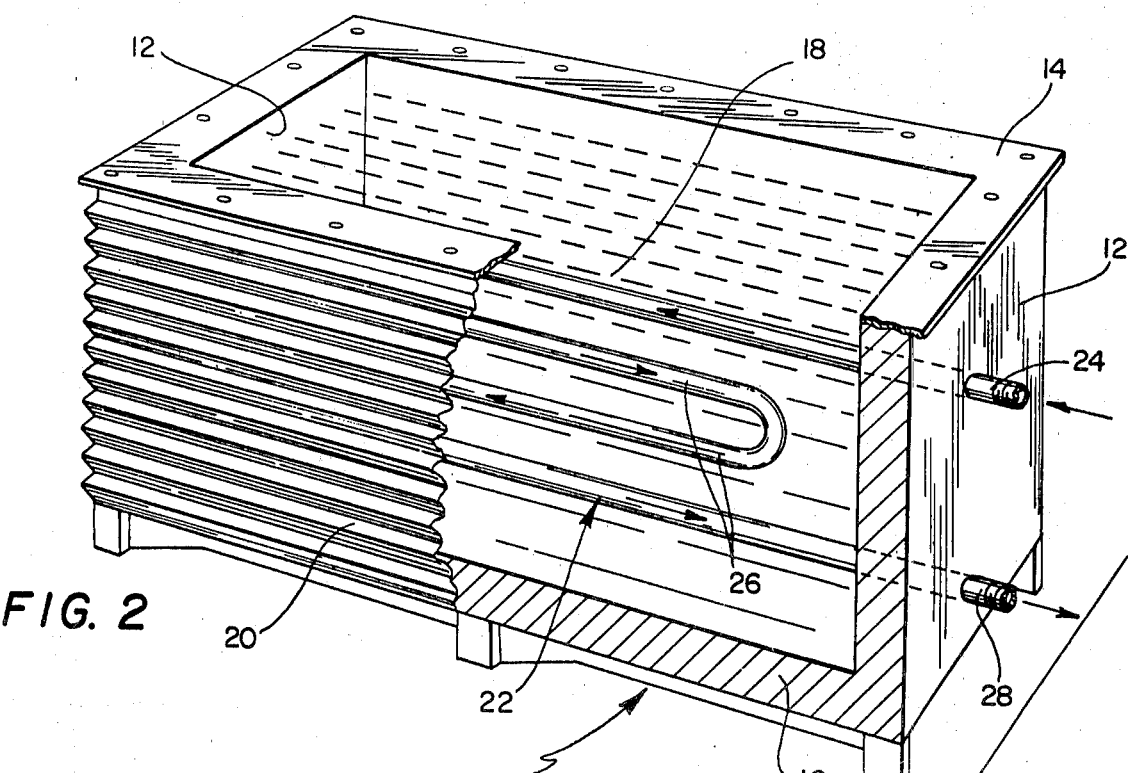
FIG. 2 is a perspective view, partly broken away, of the solar furnace of the present invention.
Figure 3:
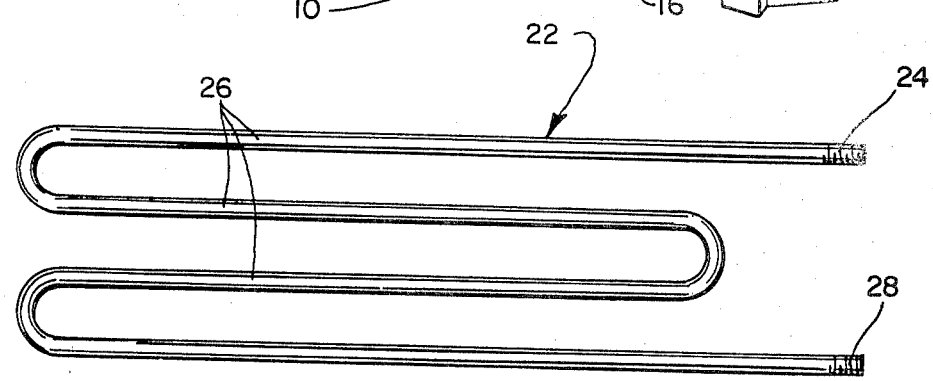
FIG. 3 is a side elevation of the tubing designed to carry the water through the unit.

Referring more in detail to the drawings, FIGS. 1, 2 and 3 illustrate a solar furnace designed to be placed outside of a structure on the ground and connected to the building's water system to provide hot water.

The solar furnace comprises a steel or reinforced glass fiber tank 10 having insulated end walls 12, a top wall 14 and a front wall 16. The front wall 16 and the top 14 are cut out at 18 as shown in FIG. 2. The front is covered with a corrugated wall 20, the angle of corrugation being equal to the latitude plus 10°. Insulating glass or transparent plastic twin-wall (not shown) is mounted in front of the corrugated portion and secured to the tank, while insulation 16 surrounds the tank and an insulated cover (FIG. 1) completes the insulation.

Water is circulated through the tank through the tubing 22. The cold water enters at the upper end 24 as the tube passes through the end wall 12 and is bent to form lengths 26 (4 shown) with the heated water passing out at the end 28. The ends 26 and 28 are directly connected with the building's water system since the unit operates on the normal water supply pressure.

The tank 10 is now filled with a suitable heat storage material. The preferred material is eutectic salts. These salts store the heat from the collector side of the tank. They also act as heat transfer mediums to heat the water passing through the tubes 22. The salts are added after the tank is placed in its permanent site by heating to the melting point (80°) and pouring into the tank and around the tubes 22. Other materials, such as concrete, may also be used for the purpose.

In operation, the solar rays strike the tank 10 particularly at the corrugations 20, to transfer the heat to the material in the tank. The material, salts, concrete, etc., is in contact with the tubing 22 which carries the water. The water is thus heated as it passes through. The eutectic salts or other material serves to store the heat and transfers it to the water. The unit is thus a self-contained, free standing solar heat collector, solar heat storage, and solar heat exchanger in a single compact unit. This eliminates the need for differential thermostats, controls, heat exchangers, and pressure reducing controls. It can be installed in old and new structures for home or industrial hot water systems with two simple pipe connections. The unit thus uses the heat storage area itself as the solar collector and heat exchanger. The cost is comparatively small.

The unit is modular in that one or more additional units can be readily hooked up in series or parallel with a minimum of plumbing. By doubling the tubing in the unit, it can be used for a low pressure hot water heating system using a single unit.

The invention readily lends itself to variations. For example, FIG. 4 illustrates a method of cutting further costs and reducing the size. The solar furnace 30 is a flat rectangular housing and is mounted on a cradle 32 at an angle of 45°-52° facing the sun.

As in the previous embodiment, the furnace comprises a tank with thick insulation thereabout. The tank has one metallic wall 34 exposed to solar radiation. The flat metallic plate 34 is covered by the insulating glass or plastic twin-wall (not shown). The interior is made as in the main form, with the water carrying tubing surrounded by eutectic salts or other material.

For ease of handling, the form shown in FIGS. 5 and 6 may be used. However, the small size requires a plurality of such units to be set up in a bank to equal the capacity of the main form. Referring to FIG. 5, a rack 36 is designed to hold a plurality of units at an angle facing the sun, the latitude plus 10° for optimum results. The rack is provided with insulation within its interior so that all but the exposed face 38 is insulated. As in the previous embodiment of FIG. 2, the exposed face is preferably covered by a twin-glass insulating plate, (not shown). The tank comprises an elongated rectangular metallic housing provided with an intermediate opening 40 through which the storage material such as the eutectic salts can be poured and the hole sealed. The water passes through a straight tube passing through the tank and storage material. The elongated form provides sufficient contact for heating. The pipes 42 are connected in series to ensure sufficient heat from a plurality of units. These units are cheap to build and easy to handle.

FIG. 6 illustrates a variation of the unit shown in FIG. 5. Here the metallic tank 44 is similar to the tank of FIG. 5 except that it is round. The rest of the construction and mounting is the same as in FIG. 5, accordingly a plurality of cylindrical units of FIG. 6 may be inserted into the insulated rack 36. The units shown in FIGS. 5 and 6 can be easily stacked side by side and connected to the water supply with a minimum of plumbing because of the ease of handling and simplicity, these units are fairly inexpensive to manufacture and set up.

I have thus provided a simple and inexpensive solar furnace which combines in a single unit a solar collector, solar storage, and a heat exchanger. The unit is cheap and efficient. Other advantages of the present invention will be readily apparent to a person skilled in the art.

I claim:

1. A solar furnace comprising a watertight tank capable of storing phase change material that changes from solid to semi-solid to liquid form, thickly insulated walls all but one wall of said tank, said one wall being a metallic wall that is exposed to permit solar radiation to be absorbed therethrough directly to said phase change material; said tank having a conduit through one of its outer walls and into and through said phase change material for passing a liquid into and out of said tank, said tank being mounted on a support outside the building for holding the tank at an angle to the horizontal so that the plate will be at an angle substantially equal to the latitude of installation plus ten degrees.

2. A solar furnace as in claim 1 wherein said support is a cradle that holds the tank at an angle facing the sun.

3. A solar furnace as in claim 2 wherein said support's an insulated cradle into which a plurality of tanks may be received.

* * * * *